United States Patent [19]

Vezza

[11] Patent Number: 4,639,474
[45] Date of Patent: Jan. 27, 1987

[54] MONOLITHIC REFRACTORY COMPOSITION

[75] Inventor: Thomas F. Vezza, West Mifflin, Pa.

[73] Assignee: Dresser Industries, Inc., Dallas, Tex.

[21] Appl. No.: 560,043

[22] Filed: Dec. 8, 1983

[51] Int. Cl.$^4$ .............................................. C21C 7/00
[52] U.S. Cl. ............................... 523/141; 106/38.28; 501/100; 523/145
[58] Field of Search ..................... 523/139–141, 523/143–147; 501/100; 106/38.28, 38.8

[56] References Cited

U.S. PATENT DOCUMENTS

| | | | |
|---|---|---|---|
| 3,303,031 | 2/1967 | Shields | 501/100 |
| 3,637,412 | 1/1972 | Felice et al. | 106/38.28 |
| 3,954,695 | 5/1976 | Cleland | 260/DIG. 40 |
| 4,083,716 | 4/1978 | Yoshida | 75/58 |
| 4,108,675 | 8/1978 | Tomita et al. | 106/56 |
| 4,296,793 | 10/1981 | Yasinsky et al. | 523/145 |

Primary Examiner—Lorenzo B. Hayes

[57] ABSTRACT

A monolithic refractory composition having relatively high thermal conductivity and a relatively high degree of water insolubility consisting essentially of, by weight, 50–75% coarse grain flake graphite; 5–30% fine grain flake graphite; and the remainder crude clay; and the addition based upon the total weight of said mix of 10–25% liquid phenolic resin in combination with an alcoholic solvent, and a resin curing agent.

5 Claims, No Drawings

MONOLITHIC REFRACTORY COMPOSITION

BACKGROUND OF THE INVENTION

This invention relates to compositions particularly suited for the formation of refractory monoliths, and in particular to such a composition for forming a ramming mix for use as a cooler plate packing material in blast furnaces.

Monolithic or monolith forming refractories are special mixes or blends of dry granular or stiffly plastic refractory materials, with which virtually joint free linings are formed. They embrace a wide range of mineral compositions and vary greatly in their physical and chemical properties. In various types of furnaces, monolithic refractories are used to advantage over brick construction. The use of monolithic refractories enables the installation to be made in a relatively short period of time whereby any delays resulting from a required manufacture of special brick shapes may be avoided. Further, the use of monolithic refractories frequently eliminate difficult brick laying tasks. The use of monolithic refractories is of particularly importance in the maintenance of furnaces. Substantial repairs may be made with a minimum loss of time, and in some instances, even during continued operation of the furnace.

A ramming mix is one type of composition typically used to create a monolith. One application of a ramming mix involves the use thereof as a cooler plate packing material in blast furnaces. Requirements for the ramming mix to satisfy the needs of this particular application include relatively high thermal conductivity, a dried cold crushing strength of at least 1000 psi, reheat stability at 1000° F., ramming mix or platic consistency, a relatively high degree of water insolubility, and a curing temperature not exceeding 250° F. Although some ramming mixes satisfy one or more of the required properties, the ramming mix of the present invention satisfies all of the properties. Further, the present ramming mix is sold as a single component and has a four-month shelf life.

SUMMARY OF THE INVENTION

Accordingly, it is an object of this invention to provide a ramming mix particularly suitable for use as a cooler plate packing material in blast furnaces and having the following properties:

(1) relatively high thermal conductivity;
(2) dried cold crushing strength of at least 1000 psi;
(3) reheat stability at 1000° F. (linear shrinkage not exceeding 1.5%);
(4) ramming mix or plastic consistency;
(5) a relatively high degree of water insolubility; and
(6) a curing temperature not exceeding 250° F.

The above objective is attained in a monolithic refractory batch composition comprising, by weight, 50–75% relatively large grain flake graphite; 5–30% relatively micronized flake graphite; approximately 20% ball clay, said batch further containing, based on its total weight, 10–25% liquid phenolic resin in combination with an alcoholic solvent, and 0.5–2% resin curing agent.

DESCRIPTION OF THE PREFERRED EMBODIMENT

A commercial need was identified for a refractory to be used as a packing material for a blast furnace shell and cooler plate, having the following properties:

(1) thermal conductivity of 75 Btu/ft$^2$—Hr.°F/in. at 1500° F. (in the "fast" direction);
(2) dried cold crushing strength of at least 1000 psi;
(3) reheat stability at 1000° F.; and
(4) ramming mix or plastic consistency.

As used herein, the term "fast" direction is the measurement of conductivity in a direction taken perpendicular to that in which the material is pressed in applying the same, while the "slow" direction corresponds to measurement of the thermal conductivity in the direction taken parallel to that in which the material is pressed or rammed.

Initially, it is presupposed that a monolith refractory based on silicon carbide and/or flake graphite could be produced to meet the above requirements. Initial work included evaluation of a series of bench scale mixes consisting of silicon carbide, graphite and clay. This was done to determine the effect, if any, that the addition or elimination of graphite to a commercial ramming mix would have on the Mix's plastic consistency. Referring to Tables I and II, poor plastic properties and reduced crushing strength in Mixes E, E-1 and F corresponded to the inclusion of flake graphite in amounts exceeding 12.5%. Mix A had the highest cold crushing strength (900 psi) after drying. The thermal conductivity of a ramming mix containing 10% flake graphite, was 45.8 Btu/ft$^2$—Hr.°/in. at 1500° F. in the "fast" direction. Consequently, it was assumed that the thermal conductivity of Mixes D through G would not meet the desired goal of at least 75 Btu/ft$^2$—Hr.°F./in.

TABLE I

| | Mix Designation: | | | | | | | |
|---|---|---|---|---|---|---|---|---|
| | A | A-1 | A-2 | B | B-1 | C | C-1 | D |
| Mix: | | | | | | | | |
| Silicon Carbide | | | | | | | | |
| −8/+16 mesh | | | | 40% | | | | |
| −16/+30 mesh | | | | 5% | | | | |
| −30/+50 mesh | | | | 10% | | | | |
| −50/+100 mesh | | | | 5% | | | | |
| Silicon Carbide DCF | 30 | 30 | 35 | 25 | 25 | 20 | 20 | 15 |
| 1631 Flake Graphite | — | — | — | — | — | — | — | 10 |
| Mexaloy Graphite | — | — | — | — | — | — | — | — |
| M & D Ball Clay | 10 | — | — | 15 | — | 20 | — | 15 |
| Jackson Ball Clay | — | 10 | — | — | 15 | — | 20 | — |
| SPV Volclay | — | — | 5 | — | — | — | — | — |
| Plus Additions: | | | | | | | | |
| Silicanit | | | | 2% | | | | |
| Water (for pressing) | 7.3 | 6.8 | 8.8 | 7.7 | 7.8 | 8.1 | 8.0 | 8.6 |

TABLE I-continued

|  | Mix Designation: | | | | | | | |
|---|---|---|---|---|---|---|---|---|
|  | A | A-1 | A-2 | B | B-1 | C | C-1 | D |
| Water (for storage) | 10.3 | 7.9 | 9.8 | 12.7 | 10.8 | 9.6 | 9.0 | 10.6 |
| Bulk Density, pcf (Av. 3) | | | | | | | | |
| After Heating 18 Hrs. at 250° F.: | 156 | 158 | 150 | 155 | 155 | 154 | 152 | 147 |
| After Heating 5 Hrs. at 2000° F.:* | 156 | 156 | 149 | 152 | 152 | 150 | 148 | 144 |
| Apparent Porosity, % (Av. 3) | 20.1 | 19.4 | 23.0 | 20.9 | 20.7 | 21.6 | 22.7 | 22.6 |
| After Heating 5 Hrs. at 2000° F.:* | | | | | | | | |
| Reheat 2000° F. (Av. 3)* | | | | | | | | |
| Linear Change: | −0.3 | −0.2 | +0.2 | ±0.2 | ±0.3 | ±0.3 | −0.3 | −0.3 |
| Volume Change: | −0.8 | −0.2 | −0.2 | −0.4 | −0.3 | −0.3 | −0.7 | −0.8 |
| Cold Crushing Strength, psi | 900 | 890 | 740 | 730 | 740 | 640 | 600 | 630 |
| After Heating 18 Hrs. at 250° F. | | | | | | | | |
| Workability (Storage Data) | 40 | 40 | 35 | 37 | 43 | 37 | 39 | 33 |
| 14# wt. as Made for Pressing | | | | | | | | |
| Tempered for Storage | 43 | 50 | 50 | 50 | 45 | 43 | 44 | 46 |
|  | (5# wt.) | | | (5# wt.) | (5# wt.) | | | |
| After One Week | 29 | 26 | 32 | 56 | 31 | 31 | 30 | 33 |
|  | (5# wt.) | | | | (5# wt.) | | | |
| After One Month | 42 | 21 | 24 | 55 | 50 | 24 | 23 | 33 |
| After Two Months | 33 | 22 | 25 | 49 | 39 | 21 | 19 | 33 |
| After Three Months | 37 | 16 | 24 | 44 | 35 | 18 | 15 | 38 |

*Reducing conditions.

TABLE II

|  | Mix Designation: | | | | | | |
|---|---|---|---|---|---|---|---|
|  | D-1 | D-2 | E | E-1 | E-2 | F | G |
| Silicon Carbide | | | | | | | |
| −8/+16 mesh | | | | 40% | | | |
| −16/+30 mesh | | | | 5% | | | |
| −30/+50 mesh | | | | 10% | | | |
| −50/+100 mesh | | | | 5% | | | |
| Silicon Carbide DCF | 15 | 20 | 12.5 | 12.5 | 15 | 15 | 15 |
| 1631 Flake Graphite | 10 | — | 12.5 | 12.5 | — | 15 | — |
| Mexaloy Graphite | — | 10 | — | — | 15 | — | 15 |
| M & D Ball Clay | — | — | 15 | — | — | 10 | 10 |
| Jackson Ball Clay | 15 | — | — | 15 | — | — | — |
| SPV Volclay | — | 10 | — | — | 10 | — | — |
| Plus Additions: | | | | | | | |
| Silicanit | | | | 12% | | | |
| Carboxymethyl Cellulose | — | — | — | — | — | 0.75 | 0.75 |
| Water (for pressing) | 8.5 | 9.7 | 8.5 | 8.6 | 10.0 | 12.6 | 13.5 |
| Water (for storage) | 10.0 | 11.2 | 10.0 | 10.1 | 11.1 | 14.6 | 15.5 |
| Bulk Density, pcf (Av. 3) | | | | | | | |
| After Heating 18 Hrs. at 250° F.: | 146 | 144 | 145 | 144 | 140 | 131 | 125 |
| After Heating 5 Hrs. at 2000° F.:* | 143 | 142 | 142 | 141 | 137 | 129 | 124 |
| Apparent Porosity, % (Av. 3) | 22.8 | 23.8 | 23.2 | 23.1 | 25.1 | 30.1 | 32.1 |
| After Heating 5 Hrs. at 2000° F.:* | | | | | | | |
| Reheat 2000° F. (Av. 3)* | | | | | | | |
| Linear Change: | −0.2 | −0.4 | ±0.2 | −0.2 | −0.2 | −0.1 | ±0.4 |
| Volume Change: | −0.5 | −0.5 | −0.4 | −0.7 | −0.4 | −0.5 | −0.4 |
| Cold Crushing Strength, psi | 600 | 750 | 540 | 510 | 600 | 560 | 280 |
| After Heating 18 Hrs. at 250° F. | | | | | | | |
| Workability (Storage Data) | 35 | 30 | 32 | 39 | 32 | 35 | 35 |
| 14 # wt. as Made for Pressing | | | | | | | |
| Tempered for Storage | 50 | 43 | 43 | 50 | 46 | 46 | 46 |
| After One Week | 43 | 36 | 26 | 36 | 38 | 36 | 38 |
| After One Month | 34 | 33 | 29 | 39 | 38 | 52 | 50 |
| After Two Months | 31 | 32 | 28 | 34 | 35 | 60+ | 60+ |
| After Three Months | 30 | 32 | 28 | 35 | 37 | — | — |

*Reducing conditions.

Referring to Table III, there is shown the results of the testing of a second series of mixes. The second series of mixes, labeled H through L, were made from a batch including silicon carbide, clay and increased amounts of either Mexaloy, micronized amorphous, or micronized flake graphite. These mixes also contained a powdered pitch addition to improve crushing strength after drying. Mixes I, K and L included micronized flake graphite. These mixes required additional quantities of water for forming the monolith and consequently, the density of the monolith was significantly reduced. The thermal conductivity of Mix H and J was determined to be 30 Btu/ft$^2$—Hr.°F./in. in the "slow" direction. None of these mixes proved commercially acceptable.

TABLE III

|  | Mix Designation: | | | | |
|---|---|---|---|---|---|
|  | H | I | J | K | L |
| Mix: | | | | | |

TABLE III-continued

| | Mix Designation: | | | | |
|---|---|---|---|---|---|
| | H | I | J | K | L |
| Silicon Carbide | | | | | |
| −8/+16 mesh | 40% | 40% | 40% | 40% | 28% |
| −16/+30 mesh | 5 | 5 | 10 | 5 | 10 |
| −30/+50 mesh | 10 | 10 | 5 | 10 | 4 |
| −50/+100 mesh | — | 5 | — | 5 | — |
| Silicon Carbide, DCF | — | 5 | — | — | — |
| Ashbury Micronized Graphite #505 | 30 | — | — | — | 30 |
| Ashbury Micronized Graphite #FG | — | 20 | — | 27 | 10 |
| Mexaloy Graphite | — | — | 40 | — | — |
| Powdered Pitch | 10 | 10 | 10 | 10 | 8 |
| M & D Ball Clay | 5 | 5 | 5 | — | — |
| SPV Volclay | — | — | — | 3 | — |
| Plus Additions: | | | | | |
| Silicanit | | | 2% | | |
| Water (for pressing) | 10 | 12 | 12 | 14 | 14 |
| Water (for storage) | 13 | 21 | 16 | 23 | 23 |
| Bulk Density, pcf (Av. 3) As Made: | 134 | 127 | 134 | 120 | 124 |
| After Heating 18 Hrs. at 250° F.: | 124 | 116 | 120 | 107 | 110 |
| After Heating 5 Hrs. at 2000° F.:* | 118 | 112 | 114 | — | — |
| Method of Forming: | 2⅛" × 2½" Cylinders Pressed at 1000 psi | | | | |
| Cold Crusing Strength, psi (Av. 3) | | | | | |
| After Heating 18 Hrs. at 250° F. | 930 | 650 | 950 | 370 | 690 |
| After heating 18 Hrs. at 400° F. | 1380 | 1190 | 1120 | 670 | 1090 |
| Workability (Storage Data) | 29 | 35 | 42 | 25 | 29 |
| 5# wt. as Made: | | | | | |
| After One Week | 25 | 30 | 41 | 24 | 23 |
| After One Month | 49 | 62 | 27 | 19 | 20 |
| | | (14# wt.) | | | |
| After Two Months | 40 | 20 | 60 | 17 | 50 |
| | (14# wt.) | | (14# wt.) | | (14# wt.) |

*Reducing conditions.

Additional mixes were prepared (M, N, O, P and R) as indicated in Table IV. These mixes were prepared as resin bonded, flake graphite plastics. These mixes contained 80 to 100% flake graphite (Asbury 3166A and Asbury micronized FG) with additions of alumina (M) or ball clay (N, O and P). The resin required to bring these mixes to a plastic consistency ranged from 35 to 50%. These mixes were pressable, but laminations and severe cracking occurred after drying of the pressed specimen.

TABLE IV

| | Mix Designation: | | | | |
|---|---|---|---|---|---|
| | M | N | O | P | R |
| Mix: | | | | | |
| Asbury 3166A Graphite | 50% | 55% | 60% | 55% | 60% |
| Asbury Micronized Flake Graphite, FG | 30 | 30 | 30 | 30 | 410 |
| M & D Ball Clay | — | 15 | 10 | 15 | — |
| A-17 Alumina | 20 | — | — | — | — |
| Plus Additions: | | | | | |
| ML-53 Resin | 35 | 35 | — | — | — |
| RL-2302 Resin | — | — | — | 50 | 50 |
| RM 441 Resin | — | — | 35 | — | — |
| Stadex | 4.0 | 4.0 | 4.0 | 4.0 | 4.0 |
| Darvon C | 0.10 | 0.10 | 0.10 | 0.10 | 0.10 |
| Method of Forming: | Six inch bars were pressed at 1000 psi | | | | |
| Observation: | None of these mixes had good compaction properties and laminations resulted after pressing. | | | | |
| Bulk Density, pcf After Drying 18 Hrs. at 500° F. | 100 | 93 | 102 | 100 | 93 |

Additional mixes (X, Y and Z) were prepared as ramming mixes having reduced binder additions. These mixes are described in detail in Table V. Mixes Y and Z (100% flake graphite) contained reduced amounts of liquid resin, while Mix X contained water. Mix Y, having the 20% addition of ball clay, provided a mix with the best rammability. The thermal conductivity of Mix Y in the "slow" direction was 55.0 Btu/ft$^2$—Hr.°F./in. at 1500° F. In contrast, Mix X had a thermal conductivity value of 35.0 Btu/Ft$^2$—Hr.°F./in. at 1500° F. in the "slow" direction. The thermal conductivity for Mix Y was also determined in the "fast" direction. This was done by continuously ramming a large block of material and then cutting nine-inch straights from the block. The thermal conductivity was measured perpendicular to the direction of ramming. The thermal conductivity value for Mix Y in the "fast" direction was 82.6 Btu/Ft$^2$—Hr.°F./in. at 1500° F. This represents a difference of 27.5 Btu/Ft$^2$—Hr.°F./in. over the thermal conductivity value of the same mix in the "slow" direction.

TABLE V

| | Mix Designation: | | |
|---|---|---|---|
| | X | Y | Z |
| Mix: | | | |
| Asbury 3166A Flake Graphite | 40% | 50% | 50% |
| Asbury Micronized Flake Graphite FG | 30 | 30 | 50 |
| M & D Ball Clay | 20 | 20 | — |
| Powdered Pitch | 10 | — | — |
| Plus Additions: | | | |
| RM441 Liquid Resin | — | 21 | 30 |
| Water | 18 | — | — |
| Stadex | 4 | 4 | 4 |
| Darvon C | 0.10 | 0.10 | 0.10 |
| Bulk Density, pcf (Av. 3) As Made: | | | |
| After Heating 18 Hrs. at 500° F. | 110 | 117 | 102 |
| After Heating 5 Hrs. at 1500° F.* | 90 | 108 | 86 |
| Forming Pressure, psi: 1000 | 2000 | 1000 | 1000 |
| Appearance After Forming: | Some laminations oc- | Good compaction | Severe laminations |

TABLE V-continued

| | Mix Designation: | | |
|---|---|---|---|
| | X | Y | Z |
| | curred in shape | properties | occurred in pressed 9" straights |
| Cold Crushing Strength psi (Av. 3) After Heating 18 Hrs. at 500° F.: | 650 | 1310 | 440 |
| Linear Change, % | | | |
| After Heating 18 Hrs. at 500° F. | −0.8 | −0.4 | — |
| After Heating 5 Hrs. at 1500° F.:* | — | −1.2 | — |
| Observed Storage Behavior: | | | |
| After 1 week | Good | Good | — |
| After 1 month | Good | Good | — |
| After 2 months | — | Good | — |
| Bulk Density, pcf (Av. 3) | | | |
| After Ramming Continuously: | — | 103 | — |
| After Ramming and Heating 18 Hrs. at 500° F. | — | 93 | — |
| Appearance after Ramming And Drying at 500° F. (Mix Y only) | | Cut samples from large rammed blocks were essentially lamination free. The brick were submitted for Thermal Conductivity Determination in the "Fast Direction". | |

*Reducing conditions.

After heating at 1500° F., Mix Y had a linear change of −1.2% and a volume change of −3.8%. Table VI illustrates a comparison of the thermal conductivity between mixes H, J, X and Y.

Based upon the test work, it was determined that Mix Y would represent the best candidate for a graphite based high conductivity ramming mix. A sample of the mix was tested, with the evaluation of the test indicating that the mix was commercially satisfactory in all respects, except that it had a relatively high degree of water solubility and required a higher than desired resin curing temperature of 500° F. It was decided to conduct additional testing to develop a high thermal conductivity mix having a high degree of water insolubility and a curing temperature of about 250° F. Mix Y was used as the starting basis for the additional test work.

ing water for six hours. Initial tests indicated that Mix EE, which contained RL-2302 resin manufactured by Borden Chemical Company (RL-2302 resin was formerly sold as ML-25R resin), showed the best water insolubility (lowest weight loss). RL-2302 resin is a phenolic resin which can be thermoset by the addition of a curing agent. As curing agent either hexamethylenetetramine ("hexa") or stadex were used. The curing agents caused the resin to thermoset at relatively low temperatures at about 250° F. An alcoholic solvent such as ethylene glycol was also used in some instances.

TABLE VII

| | Mix Designation: | | | | |
|---|---|---|---|---|---|
| | AA | BB | CC | DD | EE |
| Mix: | | | | | |
| Asbury 3166A Flake Graphite | 50 | 50 | 50 | 50 | 50 |
| Asbury FG110 Micronized Flake Graphite | 30 | 30 | 30 | 30 | 30 |
| M & D Ball Clay | 20 | 20 | 20 | 20 | 20 |
| Plus Additions: | | | | | |
| RM441 Resin (65% solids) | 25 | — | — | — | — |
| RL-2304 Resin | — | 22 | — | — | — |
| SD 5132 Powdered Resin | — | — | 10 | — | — |
| SD 5144 Powdered Resin | — | — | — | 15 | — |
| RL-2302 Resin | — | — | — | — | 22 |
| Ethylene Glycol | — | 8 | — | — | 12 |
| Water | — | — | 20 | 20 | — |
| Hexa | 1.6 | 1.4 | 1.0 | — | 1.8 |
| Stadex | — | — | — | 4.0 | — |
| Method of Forming: | 1.5" × 1.5" Dia Cylinders Were Pressed at 1000 psi | | | | |
| Bulk Density, pcf After Pressing at 1000 psi: | 117 | 116 | 107 | 106 | 115 |
| After Drying 18 Hrs. at 180° F. | 109 | 108 | — | — | 108 |
| After Drying 12 Hrs. at 250° F.* | — | 107 | — | — | 108 |
| Cold Crushing Strength psi After Drying | | | | | |
| 18 Hrs. at 180° F.: | — | 1190 | — | — | 1050 |
| After Drying 18 Hrs. at 250° F.: | — | 1420 | — | — | 1370 |
| Water Solubility Test, % Weight Loss | | | | | |
| After Drying at 180° F. and Boiling 6 Hrs. | 6.3 | 4.2 | Dissolved | | 2.4 |
| After Drying at 250° F. and Boiling 6 Hrs. | 4.5 | 2.8 | 2.5 | 3.5 | 2.3 |

TABLE VI

Thermal Conductivity on Selected Mixes*

| Mix Designation: | | | | | | | | | |
|---|---|---|---|---|---|---|---|---|---|
| H Slow Direction | | J Slow Direction | | X Slow Direction | | Y Slow Direction | | Y Fast Direction | |
| Mean Temperature (°F.) | Thermal Conductivity | Mean Temperature (°F.) | Thermal Conductivity | Mean Temperature (°F.) | Thermal Conductivity | Mean Temperature (°F.) | Thermal Conductivity | Mean Temperature (°F.) | Thermal Conductivity |
| 323 | 23.73 | 323 | 25.40 | 311 | 24.59 | 306 | 50.16 | 311 | 84.89 |
| 1065 | 26.03 | 1050 | 27.51 | 1146 | 26.74 | 1154 | 46.0 | 1165 | 82.58 |
| 1805 | 33.98 | 1792 | 33.30 | 1781 | 38.94 | 1838 | 56.66 | 689 | 85.94 |
| 1455 | 31.56 | 1445 | 32.07 | 1426 | 36.59 | 1471 | 56.44 | 225 | 88.96 |
| 1089 | 28.86 | 1089 | 30.07 | 1044 | 35.05 | 1088 | 55.04 | | |
| 720 | 26.88 | 717 | 27.96 | 660 | 36.00 | 699 | 54.19 | | |
| 243 | 24.48 | 249 | 25.96 | 224 | 34.94 | 236 | 56.23 | | |

*Argon Atmosphere
Btu/Ft²-Hr. °F./in.

Table VII illustrates the test work conducted on additional mixes AA-EE. A resorcinol type resin and various powdered phenolic resins were added to the mixes in an attempt to achieve the best water insoluble cure. Water solubility was measured by determining the weight loss of cured samples that were exposed to boil- Additional tests were conducted as illustrated in Table VIII with newly prepared mixes FF-JJ. These mixes were all made with RL-2302 resin. In these mixes, the amount of Asbury FG micronized graphite was varied in the mix to determine the effect on rammability, pore size, and ultimately, thermal conductivity. A Mercury porosimetry test, conducted on Mixes GG, II and JJ, determined that Mix II had the smallest average pore diameter (5 microns). The thermal conductivity of Mix II was determined perpendicular to the direction of ramming (high thermal conductivity value or "fast" direction) and parallel to the direction of ramming (low thermal conductivity value or "slow" direction).

TABLE VIII

| | Mix Designation: | | | | |
|---|---|---|---|---|---|
| | FF | GG | HH | II | JJ |
| Mix: | | | | | |
| Asbury 3166A Flake Graphite | 55 | 60 | 65 | 70 | 80 |
| Asbury FG110 Micronized Flake Graphite | 25 | 20 | 15 | 10 | — |
| M & D Ball Clay | 20 | 20 | 20 | 20 | 20 |
| Plus Additions: | | | | | |
| RL-2302 Resin | 22 | 22 | 18 | 16 | 14 |
| Ethylene Glycol | 7 | 2.5 | 3 | 3 | 2.5 |
| Hexa | 1.8 | 1.8 | 1.8 | 1.5 | 1.2 |
| Method of Forming: | 1.5" × 1.5" Dia Cylinders Were Pressed at 100 psi | | | | |
| Bulk Density, pcf | | | | | |
| After Ramming and Drying at 250° F. | — | — | — | 112 | 98 |
| After Pressing at 100 psi: | 112 | 114 | 116 | 117 | 121 |
| After Drying 18 Hrs. at 180° F. | 108 | 111 | 112 | 113 | 116 |
| After Drying 18 Hrs. at 250° F.* | 108 | 110 | 112 | 112 | 111 |
| After Heating 5 Hrs. at 1000° F. | — | — | — | 109 | — |
| Apparent Porosity, % | — | 15.6 | 15.6 | 17.1 | 17.0 |
| After Ramming and Drying 18 Hrs. at 250° F. | | | | | |
| Average Pore Dia., Microns (Mercury Porosimetry) | — | 8.5 | — | 5.0 | 6.3 |
| After Ramming and Drying 18 Hrs. at 250° F. | | | | | |
| Cold Crushing Strength psi | | | | | |
| After Drying at 180° F. | 1070 | 1850 | 1840 | 1740 | 1930 |
| After Drying 250° F. | 1550 | 1920 | 2160 | 1800 | 2720 |
| Linear Change, % | | | | | |
| After Drying at 250° F. | — | −0.7 | −0.2 | −0.3 | −0.6 |
| After Heating 5 Hrs. at 1000° F., Reducing | — | — | — | −1.0 | — |
| Volume Change, % | | | | | |
| After Drying at 250° F. | — | −0.7 | −0.2 | −0.2 | −0.3 |
| After Heating 5 Hrs. at 1000° F., Reducing Water Solubility % Weight Loss | — | — | — | −3.0 | — |
| After Drying at 180° F., and Boiling 6 Hrs. | 2.1 | 3.8 | 4.8 | 4.9 | 4.6 |
| After Drying at 250° F., and Boiling 6 Hrs. | 1.3 | 0.7 | 0.7 | 0.6 | 0.4 |

Table IX illustrates the comparative testing conducted on these mixes.

Mix II had the best ramming and compaction properties compared to other mixes. Its degree of water insolubility after curing at 180° F. and 250° F. was improved compared to previously developed mixes. The thermal conductivity of this material was 168.3 Btu/Ft$^2$—Hr.°F./in. compared to 84.9 Btu/Ft$^2$—Hr.°F./in. for previously developed Mix Y ("fast" direction). Mix JJ had a thermal conductivity of 69.4 Btu/Ft$^2$—Hr.°F./in. Mix II had improved thermal conductivity compared to mixes Y and JJ due to better ramming properties, increased rammed density, and smaller average pore size. Mix II therefore achieved the best overall commercial characteristics as a ramming mix for packing around blast furnace cooler plates. Mix II has high conductivity, high cold crushing strength (in excess of 1500 psi after heating at 250° F.), a high degree of water insolubility and good ramming properties.

TABLE IX

Thermal Conductivity (Argon Atmosphere)

| Mix Designation: | | | | | | | | | |
|---|---|---|---|---|---|---|---|---|---|
| Y* Fast Direction | | Y* Slow Direction | | II** Fast Direction | | II** Slow Direction | | JJ** Fast Direction | |
| Mean Temperature (°F.) | Thermal Conductivity | Mean Temperature (°F.) | Thermal Conductivity | Mean Temperature (°F.) | Thermal Conductivity | Mean Temperature (°F.) | Thermal Conductivity | Mean Temperature (°F.) | Thermal Conductivity |
| 311 | 84.9 | 306 | 50.2 | 312 | 168.3 | 309 | 54.2 | 310 | 69.4 |
| 1165 | 82.6 | 1154 | 46.0 | 1201 | 139.6 | 1180 | 50.5 | 1226 | 65.5 |
| 689 | 85.9 | 699 | 54.2 | 709 | 143.0 | 709 | 53.7 | 733 | 69.3 |
| 225 | 89.0 | 236 | 56.2 | 258 | 152.0 | 244 | 55.6 | 242 | 76.7 |

*Test Samples were cured at 500° F.
**Test Samples were coked at 1000° F.
***Test Samples were cured at 250° F.

Table X illustrates the Taylor Standard Series screen analysis of Mix II.

TABLE X

| Mix Designation: | II | |
|---|---|---|
| Screen Analysis % Held on | | |
| 8 mesh | | |
| 10 mesh | | |
| 14 | — | |
| 20 | — | |
| 28 | 2 | 2 |
| 35 | 8 | |
| 48 | 28 | |
| 65 | 22 | 58 |
| 100 | 10 | |
| 150 | — | 10 |
| 200 | 2 | |
| 270 | — | |
| 325 | — | 2 |
| Minus 325 mesh | 28 | 28 |

While the preferred embodiment of the present invention has been described and illustrated, the invention should not be limited thereto, but may be otherwise embodied within the scope of the following claims.

The embodiments of the invention in which an exclusive property or privilege is claimed are defined as follows:

1. A monolithic refractory composition having relatively high thermal conductivity and a relatively high degree of water insolubility consisting essentially of, by weight, 50–70% relatively large grain flake graphite, 5–30% micronized flake graphite and the remainder crude clay, and the addition based upon the total weight of said mix of 10–25% liquid thermosetting phenolic resin in combination with an alcoholic solvent, and a thermosetting resin curing agent.

2. A monolithic refractory composition in accordance with claim 1 wherein the relatively large flake graphite comprises by weight, 70%, the micronized flake graphite, 10%, and the liquid phenolic resin in combination with an alcoholic solvent, 20%.

3. A monolithic refractory composition in accordance with claim 2 wherein said mix is cured at a temperature of about 250° F. for at least six hours.

4. A monolithic refractory composition in accordance with claim 1 wherein said mix is cured at a temperature of about 250° F. for at least six hours.

5. A monolithic refractory composition in accordance with claim 1 wherein said composition is used as a ramming mix.

* * * * *